Oct. 17, 1939.　　　　K. L. TATE　　　　2,176,777
RECORDING DEVICE
Filed Aug. 18, 1937
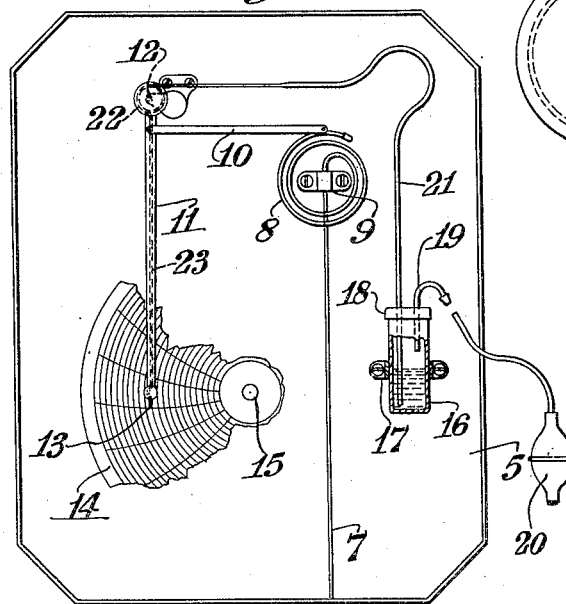
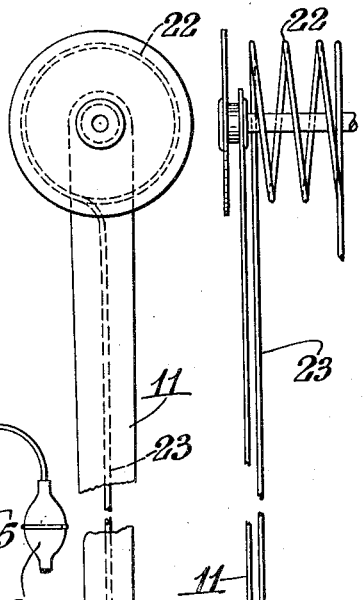
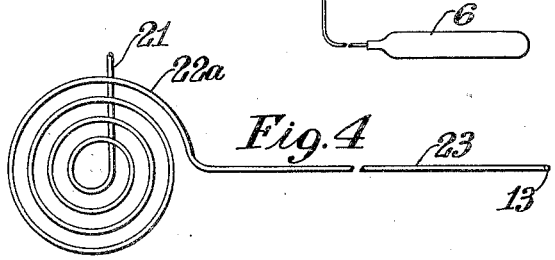
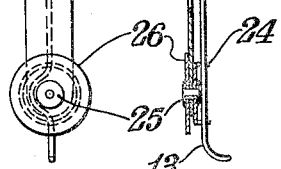
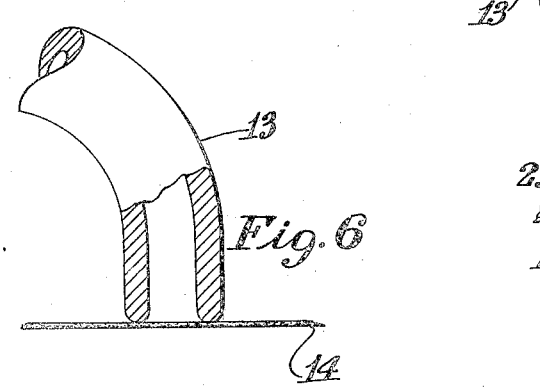
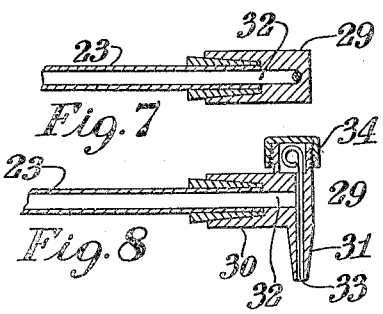
INVENTOR.
KENNETH L. TATE
BY D. Clyde Jones
ATTORNEY.

Patented Oct. 17, 1939

2,176,777

UNITED STATES PATENT OFFICE 2,176,777

RECORDING DEVICE

Kenneth L. Tate, Rochester, N. Y., assignor to Taylor Instrument Companies, Rochester, N. Y., a corporation of New York Application August 18, 1937, Serial No. 159,748

4 Claims. (Cl. 234—73)

This invention relates to a recording device.

In present recording devices where ink is used to make the record, it is the common practice to provide a small recess in the pen or stylus to hold the supply of ink. Since this recess is located in the stylus its size must necessarily be small in order not to impose too great a load on the stylus actuating mechanism. In the past, such an ink-storing recess has been only of a size to hold an amount of ink which is sufficient for a day or two and consequently, the ink supply must be frequently replenished. Furthermore, such ink recesses have been open to the atmosphere and consequently the solvent in the ink evaporates quickly, leaving a gummy mass of coagulated ink which clogs the stylus.

In accordance with the main feature of the present invention, a stationary ink-storing reservoir is located at a point remote from the stylus and is of such size that an ink supply sufficient for several months can be stored therein.

Another feature of the invention relates to the use of a capillary tube for supplying ink from an ink reservoir to the stylus of a recorder.

A further feature of the invention relates to utilizing a siphon connection for supplying ink from the reservoir to the stylus.

An additional feature of the invention relates to correlating the level of the ink in the reservoir with respect to the stylus in such a way that ink will not flow from the stylus when the recorder chart is stopped and yet the width of the graph or record line drawn by the stylus can be properly controlled through a relatively wide range of speeds in making the record.

Other features and advantages of the invention will appear from the detailed description and claims when taken with the drawing in which Fig. 1 is a front elevation of a recorder with the cover thereof removed, showing a simple form of recorder mechanism and means for supplying ink to the stylus thereof in accordance with the present invention; Figs. 2 and 3 are respectively enlarged front and side views of a stylus arm and stylus for the recorder of Fig. 1, as well as a capillary tube for supplying ink to the stylus; Figs. 4 and 5 are respectively a plan and side view of a modified arrangement of the capillary tube for supplying ink to the stylus; Fig. 6 is an enlarged fragmentary view with a portion thereof broken away indicating the manner in which the capillary tube terminates in a stylus portion and showing the relation between the stylus and the paper chart on which the record is made; and Figs. 7 and 8 are respectively, sections taken at right angles to each other through a modified form of stylus indicating particularly the manner in which the stylus is mounted on the end of the capillary tube.

Referring to the drawing, the character 5 generally designates a recorder case with the front or cover thereof removed which recorder is of the type used for recording temperature although the invention is not so limited. This recorder includes a thermosensitive tube system having a bulb 6 adapted to be located in the region, the temperature of which is to be recorded. The bulb communicates through a capillary tube 7, with a well-known Bourdon spring 8 having one of its ends secured as at 9 to the back of the case. This tube system comprising bulb 6, capillary tube 7 and Bourdon spring 8 is filled with a medium which expands when a rise in temperature takes place at the bulb and which contracts when this temperature decreases so that the Bourdon spring will unwind on an increase in temperature and will wind up when the temperature decreases. The free end of the Bourdon spring 8 is connected by a link 10 to a stylus arm which is suitably pivoted on an arbor 12 for swinging movement under the control of the Bourdon spring 8 and the link 10. The stylus arm 11 carries a stylus 13 which contacts a chart 14 suitably graduated in units of temperature and time. This chart which is herein illustrated as being of circular form, is mounted on an arbor 15 of suitable clock mechanism (not shown) so that it rotates in accordance with time. It will be understood, however, that the invention is not limited to the use of such a circular chart. In accordance with the present invention a novel arrangement is provided for feeding ink to the stylus 13. This ink-feeding arrangement comprises a reservoir or bottle 16 supported for vertical adjustment in a bracket 17 attached to the rear of the case. This bottle may be of any convenient size; in fact, it may be of such size that it will store an ink supply sufficient for several months' service. The top of the bottle is closed by a stopper 18 provided with two openings therein, in one of which a glass tube 19 is inserted to serve as a "breather." Through the other opening in the stopper there passes in air-tight relation, a metal capillary tube 21 the lower end of which projects into the ink in the bottle. It will be understood that the external diameter of the capillary tube may be of the order of .018 inch, while the bore or passage therethrough may be of the order of .008 inch. From these dimensions it will be appreciated that the capillary tube is flexible. The capillary tube after leaving the stopper 18 extends to a point where it encircles the arbor 12 in the form of a coil 22 which permits the portion 23 of the capillary tube to swing freely with the stylus arm 11. It will be understood that if the capillary tube is not made flexible throughout its length, its intermediate portion 22 should be so arranged that its lower part 23 can swing readily with the stylus arm. In other words, if a substantially rigid capillary tube is employed the intermediate portion 22 must be made flexible. The free end of the section 23 of the capillary tube as shown in Figs. 1 to 6 terminates in the stylus 13 integral therewith, being formed by bending the end portion of the capillary tube so that its end engages the chart 14. At a point adjacent the stylus, the capillary tube is secured by a suitable bracket 24 to the free end of the stylus arm 11, this bracket being attached by a hollow rivet 25 to the lower end of the stylus arm. This rivet also serves to attach a circular, colored target 26 to the stylus arm adjacent the stylus so that the target serves to indicate roughly the position of the stylus to an observer at some distance from the recorder.

It should be pointed out that the level of the ink in the reservoir of the bottle 16 is higher than the stylus 13 so that the ink flows through from the bottle and through the capillary tube 21 to the stylus by siphon action. In order to start the flow of the ink in the capillary tube, a flexible bulb or hand pump 20 is applied to the breather tube 19 and air is forced into the bottle. This air pressure serves to start the flow of ink. Also in the event that the capillary tube or stylus becomes plugged, the hand pump 20 may be used in like manner to clear out the stoppage. It has been mentioned that the level of the ink in the reservoir is above the stylus. This difference in level, designated H, should be such that the hydrostatic head of the liquid represented by the distance H should be approximately equal to the surface tension of the ink at the opening in the sylus. In other words, the hydrostatic head should not be greater than a force determined by the surface tension of the ink, the ink absorption of the paper forming the chart 14 and the writing characteristics of the stylus.

In starting the operation of the device, it is assumed that there is suitable supply of ink at the proper level in the bottle 16. Hand pump 20 is applied to the breather tube 19 to force some of the ink to fill the capillary tube as far as the stylus. The clock is started to rotate the chart according to the time and the bulb 6 is located in the region where the temperature is to be sensed. On an increase in temperature the medium in the tube system, including the bulb 6, expands and causes the Bourdon spring to unwind. The free end of this spring thus moves the link 10 toward the left to swing the stylus arm clockwise. The stylus 13 thereby draws a graph or line on the chart representative of the temperature sensed at the bulb 6. A drop in temperature causes the recorder to operate in like manner but in the reverse sense. It will be understood that the flow of ink to the stylus can be increased or decreased by respectively raising or lowering the reservoir in its bracket.

In the modified form of the invention shown in Figs. 4 and 5, a portion of the capillary tube encircling the arbor 12 is shown to be wound as a flat spiral 22a instead of in the form of a helical coil 22 shown in Figs. 2 and 3.

In the foregoing arrangement the stylus 13 is shown integral with the capillary tube, being formed by bending the end of the capillary tube to engage the chart. In Figs. 7 and 8 there is illustrated a modified type of stylus 29. This stylus may be cast or otherwise formed of metal to have an internally tapered collar 30 and writing point 31 at right angles thereto. The collar 30 frictionally engages a tapered washer in the end of the capillary tube to make an air-tight connection therewith. A passage 32 through the collar communicates with the bore of the capillary tube and with the passage 33 through the stylus point. The passage 33 which extends through the top of the stylus point, is normally closed by a removable cap 34 so that the passage 33 is accessible for the insertion of a wire to displace any foreign material.

It will be understood that the small amount of stiffness of the coil 22 in the capillary tube, supplements the stiffness of the Bourdon spring and therefore the instrument is finally calibrated after the inking assembly has been added thereto.

I claim:

1. In a recording device, a movable stylus arm, a support for said stylus, means for moving said stylus arm in accordance with a condition to be recorded, a stationary ink reservoir eccentrically located with respect to said support, and an integral metal capillary tube having one end fixed at said reservoir and communicating therewith, said capillary tube having its other end curved to form a stylus for marking on a chart, said stylus and the portion of the tube adjacent thereto being rigidly attached to said stylus arm to move therewith, the major portion of said capillary tube including said stylus having an external diameter of the order of .018 of an inch whereby a part of said tube can be readily flexed to move with said stylus arm and whereby said stylus will draw a relatively fine line on said chart.

2. In a recording device, a stylus arm having a stylus adjacent one end thereof, a pivot on which said stylus arm is supported for swinging movement, means for moving said stylus arm in accordance with a condition to be recorded, a stationary ink reservoir located eccentrically with respect to said pivot, and an integral capillary tube fixed to the stylus arm communicating with said stylus and with the ink in said reservoir, said capillary tube having a stationary portion at said reservoir and having a flexible portion adjacent the pivot of said stylus arm.

3. In a recording device, a stylus arm having a stylus adjacent one end thereof, a pivot on which said stylus arm is supported for swinging movement, means for moving said stylus arm about said pivot in accordance with a condition to be recorded, an ink reservoir eccentrically mounted with respect to said pivot, and an integral metal capillary tube communicating with said stylus and with the ink in said reservoir that portion of the tube adjacent the stylus being rigidly secured to the stylus arm, said capillary tube having a stationary portion at said reservoir and having a coiled flexible portion adjacent the pivot of said stylus arm.

4. In a recording device, a stationary ink reservoir, an integral metal capillary tube, said tube being looped intermediate its ends about an axis located eccentrically of the reservoir to provide a pair of arms relatively movable about said axis, the free end of one of said cams being fixed and communicating with said reservoir, the free end of the other arm being provided with a stylus positioned over a chart to discharge ink from said reservoir to said chart, and means for moving said last-mentioned arm about said axis in response to changes in a condition to be recorded.

KENNETH L. TATE.